(12) United States Patent
Woollenweber

(10) Patent No.: US 7,677,041 B2
(45) Date of Patent: Mar. 16, 2010

(54) BEARING SYSTEMS FOR HIGH-SPEED ROTATING MACHINERY

(76) Inventor: William E. Woollenweber, 3169 Camino Del Arco, Carlsbad, CA (US) 92009-7856

( * ) Notice: Subject to any disclaimer, the term of this patent is extended or adjusted under 35 U.S.C. 154(b) by 108 days.

(21) Appl. No.: 11/546,138

(22) Filed: Oct. 11, 2006

(65) Prior Publication Data

US 2008/0087018 A1 Apr. 17, 2008

(51) Int. Cl.
*F02B 33/44* (2006.01)
*F16C 33/44* (2006.01)

(52) U.S. Cl. .................. 60/608; 417/406; 417/407; 384/452; 384/453; 384/454; 384/455; 384/493; 384/504; 384/512

(58) Field of Classification Search ............... 60/608; 417/406, 407; 384/452–455, 504, 512, 493
See application file for complete search history.

(56) References Cited

U.S. PATENT DOCUMENTS

| | | | | |
|---|---|---|---|---|
| 2,492,672 A | * | 12/1949 | Wood | 417/407 |
| 3,043,636 A | | 7/1962 | MacInnes et al. | 308/121 |
| 3,056,634 A | | 10/1962 | Woollenweber et al. | |
| 3,096,126 A | | 7/1963 | Woollenweber et al. | |
| 3,258,199 A | | 6/1966 | Anderson | 230/207 |
| 3,390,926 A | | 7/1968 | Woollenweber | |
| 3,806,790 A | * | 4/1974 | Marshall | 320/104 |
| 3,993,370 A | | 11/1976 | Woollenweber | |
| 4,364,717 A | | 12/1982 | Schippers et al. | 417/407 |
| 4,370,106 A | | 1/1983 | Lauterbach | |
| 4,641,977 A | | 2/1987 | Woollenweber | |
| 4,789,253 A | | 12/1988 | Perego | 384/517 |
| 4,808,091 A | | 2/1989 | Ruetz | 417/407 |
| RE34,276 E | * | 6/1993 | Glaser et al. | 417/407 |
| 5,522,667 A | * | 6/1996 | Miyake | 384/492 |
| 5,778,668 A | * | 7/1998 | Adleff et al. | 60/339 |
| 5,857,332 A | | 1/1999 | Johnston et al. | 60/607 |
| 6,478,553 B1 | * | 11/2002 | Panos et al. | 417/407 |
| 6,623,166 B2 | * | 9/2003 | Andren et al. | 384/517 |
| 6,739,845 B2 | | 5/2004 | Woollenweber | 417/407 |
| 6,808,310 B2 | * | 10/2004 | Ooitsu et al. | 384/527 |
| 6,877,901 B2 | | 4/2005 | Woollenweber | |
| 6,936,934 B2 | * | 8/2005 | Morimoto et al. | 307/9.1 |
| 6,994,531 B2 | * | 2/2006 | Dairokuno et al. | 417/423.6 |
| 7,025,579 B2 | | 4/2006 | Woollenweber et al. | |
| 7,371,011 B2 | * | 5/2008 | McKeirnan, Jr. | 417/407 |
| 2004/0200215 A1 | * | 10/2004 | Woollenweber et al. | 60/407 |

* cited by examiner

*Primary Examiner*—Thomas E Denion
*Assistant Examiner*—Mary A Davis
(74) *Attorney, Agent, or Firm*—David H. Badger, Esq.

(57) ABSTRACT

Bearing systems for high speed rotating shafts, such as turbocharger shafts, include a first ball bearing in one end of an elongated cylinder capable of carrying axial thrust in both directions and a second ball bearing in the opposite end of the elongated cylinder with its outer race slideably mounted in the cylinder against the biasing force of a preload spring. The second ball bearing is free to move axially with the shaft upon axial expansion of the shaft when exposed to high temperature. The inner races of the ball bearings are clamped to and rotate with the shaft as part of the rotating assembly.

13 Claims, 2 Drawing Sheets

BEARING SYSTEMS FOR HIGH-SPEED ROTATING MACHINERY

FIELD OF THE INVENTION

This invention relates to bearing systems for machinery with shafts that rotate at high speeds and are exposed at one end to high temperatures, such as turbochargers used on internal combustion engines.

BACKGROUND OF THE INVENTION

This invention comprises an improvement on the bearings systems of U.S. Pat. No. 6,877,901 B2, dated Apr. 12, 2005, and U.S. Pat. No. 7,025,579 B2, dated Apr. 11, 2006.

Turbochargers have been used on both diesel and gasoline engines to increase power output, reduce fuel consumption, and compensate for high altitude power loss for many years. The success of the small turbocharger to a large part can be attributed to the development of satisfactory bearing systems that allow the machines to operate at very high speed and attain sufficient durability to make them commercially viable products.

Early small turbochargers employed stationary sleeve bearings and rotating assemblies with large diameter stiff shafts where the first critical speed was higher than the maximum operating speed of the machine. Since the maximum pressure output of the early turbocharger compressors was of the order of 1.6 times atmospheric pressure, the bearing friction losses of the large diameter bearings were acceptable.

When the potential of turbocharging high-speed diesel and gasoline engines became obvious, the pressure output of the turbocharger compressors needed to be increased substantially and the friction losses of the large diameter shafts became unacceptable.

When the shaft sizes of the small turbochargers were reduced to lower the friction losses, the critical speed of the rotating assembly fell within the operating speed range of the turbocharger and bearings systems had to be designed and developed to permit the rotating assemblies to pass through their first critical speed without failure. This pioneering work, performed primarily in the 1960's, resulted in the development of small diameter floating sleeve bearing systems where the sleeve bearing was allowed to rotate at a fraction of the speed of the rotor assembly, thereby reducing the friction losses to acceptable values.

The floating sleeve bearings still in use currently in commercial turbochargers incorporate an inner and outer oil film where the outer oil film provides a damping cushion that permits the rotor to pass through its critical speed without reaching a vibration amplitude that would cause failure of the bearings. The floating sleeve bearings also permit minor radial movement of the rotor allowing it to find and rotate about its center of mass, thereby eliminating radial forces that would be generated if the rotor were constrained to rotate about its geometric center.

The inner and outer oil films provide the necessary lubrication to prevent wear and also provide a cushion against shock and vibration. Examples of these successful bearing systems are illustrated in U.S. Pat. Nos. 3,056,634, 3,096, 126, 3,390,926, and 3,993,370.

In the floating sleeve bearing systems described above, it was necessary to provide a thrust bearing to carry the axial loads imposed by the actions of the turbine and compressor wheels used in turbochargers, and a collar was provided on the rotating shaft to bear against stationary thrust members. Since the friction loss in radial thrust bearings is a function of the fourth power of the radius, the collar attached to the shaft causes a relatively high thrust bearing friction loss which, when added to the friction loss of the sleeve bearings, results in a substantial total frictional loss for the complete bearing systems.

It is advantageous to have a bearing system in small turbochargers that has a high mechanical efficiency due to the very high speed of rotation of the rotor assemblies. Since sleeve bearing losses are proportional to the square of the rotational speed of the shaft, there have been numerous attempts in the past to develop systems that use ball bearings in small turbochargers. One such system is described in U.S. Pat. No. 4,370, 106 that discloses the use of a non-rotating, elongated cylinder with a ball bearing mounted in one end and a sleeve bearing at the opposite end. The elongated cylinder is prevented from rotating by a square flange on the end carrying the ball bearing; the square flange engaging stops in a stationary housing member. Lubricating oil is provided around the outside diameter of the elongated cylinder to provide a damping cushion for orbital motion of the rotating assembly caused by residual unbalance. This residual unbalance forces the non-rotating cylinder to orbit radially at a very high frequency and causes the mating surfaces of the square retaining flange to be subject to fretting. Thus, a solid lubricant pad was used between the mating surfaces of the square flange and corresponding stationary housing surface to mitigate the fretting problem, however, this problem still contributed to a limited service life in turbochargers using this bearing system.

The pursuit of satisfactory ball bearing systems for small turbochargers continued with the emergence of the system shown in U.S. Pat. No. 4,641,977. In this system, a ball bearing is mounted in one end of an elongated cylinder and includes a separate floating sleeve bearing near the opposite end. The elongated cylinder incorporates a round, radially extending flange on one end and the cylinder is free to rotate at a fraction of the speed of the shaft. The radially extending flange on the end of the rotatable cylinder engages corresponding surfaces of the stationary housing and carries thrust loads of the rotating assembly in both directions. Friction losses with this system are reduced due to the ball bearing and floating sleeve bearing resulting in a higher mechanical efficiency than previous systems; however, since the system contains one sleeve bearing, there remained room for improvement in mechanical efficiency if a double ball bearing system could be developed.

This invention provides improvements over the bearing systems disclosed in U.S. Pat. Nos. 6,877,901 B2, and 7,025, 579 B2. Each of these prior bearing systems employ two ball bearings mounted in an elongated cylinder that incorporates a radially extended annular flange on one end to carry thrust loads. The inner races of the ball bearings are separated by an elongated spacer, and the inner races and spacer are clamped together to rotate as an integral part of the rotor assembly.

The bearing system disclosed in U.S. Pat. No. 6,877,901 B2 shows an angular contact ball bearing mounted in both ends of a rotatable elongated cylinder. The cylinder is supplied with lube oil over its outer diameter that provides a cushion against shock and vibration and lube oil is admitted to the inner diameter to provide lubrication and cooling for the angular contact ball bearings. Under normal operating conditions, the system functions satisfactorily, however, under extreme conditions where engine exhaust temperatures reach very high levels, the turbine end of the shaft experiences axial expansion that can cause the inner race of the turbine end bearing to move axially away from the outer race that is pressed into the elongated cylinder and allows the balls in the angular contact ball bearing to skid in the races.

The bearing system disclosed in U.S. Pat. No. 7,025,579 B2 shows angular contact ball bearings mounted in both ends of an elongated cylinder that is constrained against rotation by two elastomeric members placed between the elongated cylinder and the corresponding mounting bore in the bearing housing. The elastomeric members allow small radial orbital movement of the elongated cylinder caused by rotor residual unbalance to take place, and also provide a cushion against shock and vibration. The ball bearings in this system are grease-lubricated and do not require a supply of pressurized lubricating oil from the engine.

The outer diameter of the non-rotatable elongated cylinder is exposed to a supply of cooling fluid from the bearing housing fluid cavity, which serves to carry away heat generated in the bearings when operated at high speed. The inner races of the ball bearings are separated by an elongated spacer, all of which are clamped on the shaft and rotate with it. High exhaust temperature during extreme conditions of operation causes the shaft to expand axially, and the inner race of the turbine end bearing moves axially in accordance with this expansion. This movement of the inner race of the turbine end bearing can cause the balls in the bearing to skid in the races.

SUMMARY OF THE INVENTION

The object of the invention is to improve upon the previously known bearing systems for high-speed rotating shafts, especially shafts such as turbocharger shafts that are subjected in operation to axial thermal expansion and contraction.

Another object of the invention is to provide improved bearing systems for rotating shafts that accommodate axial expansion and contraction of the shaft during operational rotation and that, at the same time, maintain optimum performance of the shaft supporting bearings.

A further object of the invention is to provide improved bearing systems for rotating shafts wherein the shaft is rotatably supported adjacent one end by a first ball bearing assembly capable of carrying axial thrust in both directions and is rotatably supported adjacent its opposite end by a second ball bearing assembly that is slidably mounted for axial movement in a bearing carrier and that is biased in a direction to maintain the integrity of the bearings races and balls while accommodating axial expansion of the shaft.

A still further object of the invention is to provide improved bearing systems for the rotating components of a turbocharger wherein the above-described first ball bearing assembly rotatably supports the compressor wheel or cool end of the turbocharger shaft and the above-described second ball bearing assembly rotatably and slidably supports the turbine wheel or hot end of the shaft, thereby to accommodate axial expansion and contraction of the shaft while maintaining the integrity of both bearing assemblies.

In accordance with the invention, the first ball bearing assembly may comprise a deep groove ball bearing, which is well known for its ability to carry thrust in both directions, or the first bearing assembly may comprise a first angular contact ball bearing that is capable of carrying axial thrust in one direction and a second angular contact ball bearing that is capable of carrying axial thrust in the opposite direction.

Also in accordance with the invention, the second ball bearing assembly may comprise an angular contact ball bearing. The outer race of the angular contact bearing assembly is slidably mounted for axial movement in a bearing carrier or cylinder and is biased, for example by a preload spring, in a direction to maintain the outer race in contact with the balls and the balls in contact with the inner race, thereby to mitigate skidding of the balls in the races at all times during operation.

In a preferred embodiment for rotatably supporting the rotating components of a turbocharger, the improved bearing system of this invention comprises a deep groove ball bearing in the compressor end of a rotatable elongated bearing carrier or cylinder capable of carrying thrust in both directions, and an angular contact ball bearing in the turbine (hot) end of the rotatable elongated cylinder that carries a preload spring engaging its outer race. The outer race of the angular contact ball bearing is free to move axially in the rotatable elongated cylinder so that, when axial expansion of the shaft takes place, the spring force against the outer race maintains the geometric integrity of the bearing at all times, essentially eliminating any possibility of the balls skidding in the races.

The improved ball bearing systems disclosed in this invention provide the engine industry with an ideal turbo machine embodying the highest mechanical efficiency due to the use of the double ball bearing systems.

These and other objects and advantages of the invention will become apparent to those of reasonable skill in the art from the following detailed description, as considered in conjunction with the accompanying drawings.

BEST MODE FOR CARRYING OUT THE INVENTION

Figure 1:
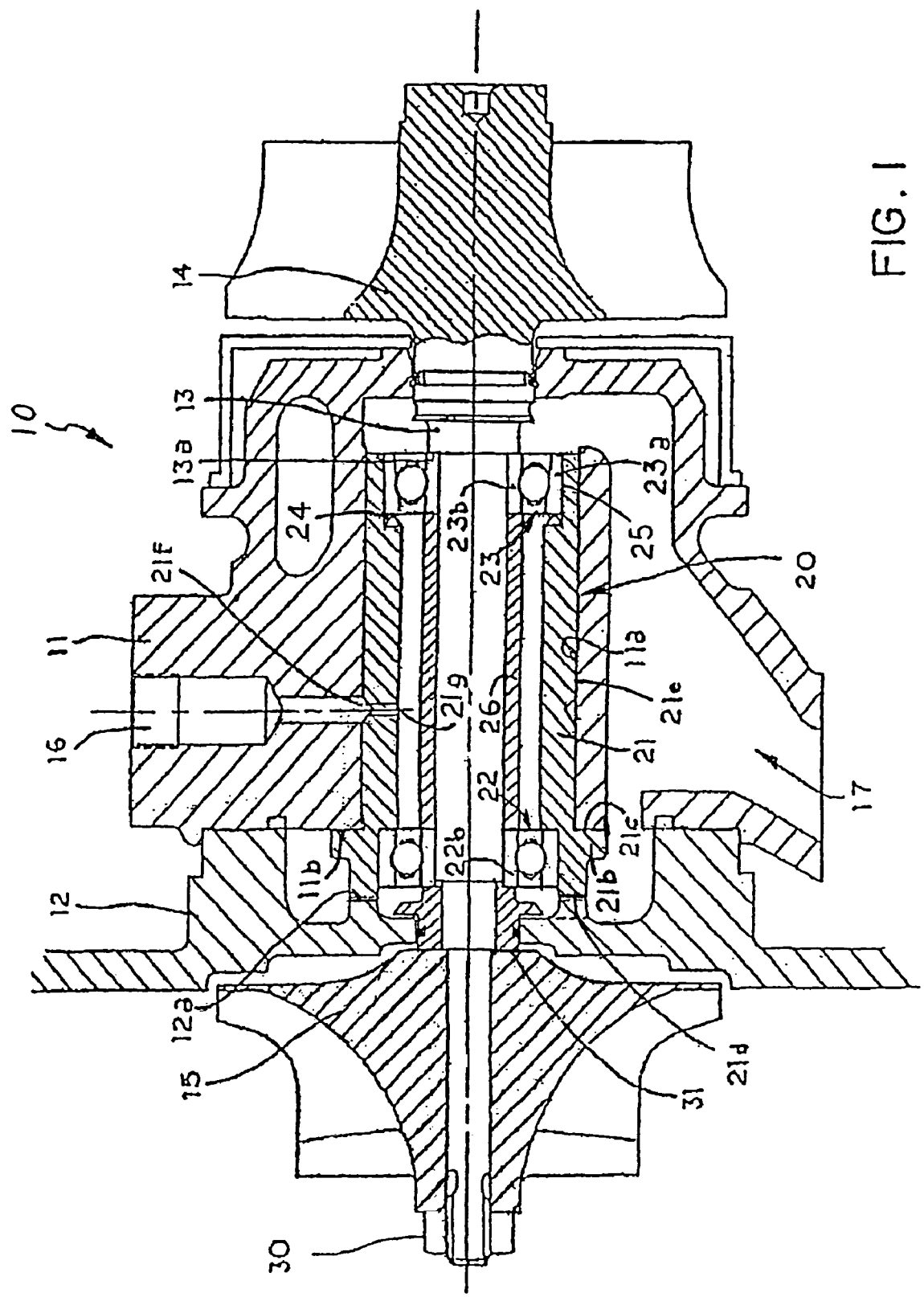
FIG. 1 is a cross-sectional view taken along a plane through the axis of rotation of a bearing system utilizing this invention.

The bearing system of this invention is adapted to support, within stationary elements of a machine, a high-speed rotating shaft. FIG. 1, for example, illustrates the stationary elements of a turbocharger 10, that is, a bearing housing 11 and an end housing 12 enclose a rotatable shaft 13 carrying a turbine wheel 14 at one end and a compressor wheel 15 at the other end. The bearing system 20 of the invention carries the rotating shaft 13 and is carried by the bearing housing 11. The bearing system 20 can support shafts in turbochargers that rotate at speeds of up to 200,000 RPM (revolutions per minute). The turbine end of the shaft is exposed to heat conducted from the hot turbine wheel 14 that is driven by engine exhaust gas.

The bearing system 20 of this invention, shown in FIG. 1, comprises a rotatable cylinder 21, carrying a deep-groove ball bearing 22 at its compressor end, and an angular contact ball bearing 23 at its turbine end. Deep-groove ball bearings are capable of resisting thrust in both axial directions, whereas angular contact ball bearings resist thrust in one axial direction only.

The angular contact ball bearing 23 cooperates with a resilient biasing means, such as a preload spring 24, which acts to keep the balls in contact with the races at all times. The angular contact ball bearing outer race 23a is slidably mounted in the rotatable cylinder bore 25 so that, when the shaft expands axially under operating conditions of high temperature, the biasing means or preload spring 24 moves the outer race 23a of angular contact bearing 23 axially in the rotatable cylinder bore 25 and maintains ball-race contact at all times.

Preferred embodiments of the invention employ ball bearings with ceramic balls, typically called hybrid ceramic bearings. Benefits of ceramic hybrid bearings are significantly increased service life, operational speed capability of up to 50% higher than steel balls, less heat buildup, and high temperature capability. These features make hybrid ceramic ball bearings ideally suited for use in turbochargers.

The combination of mounting a deep-groove ball bearing adjacent the compressor end of a rotatable shaft for resisting thrust in both axial directions, and mounting an angular contact ball bearing with a preload spring adjacent the turbine end of the shaft, provides a significantly improved bearing system for high-speed rotating machines.

The deep-groove ball bearing 22 has its outer race pressed into a bore at the compressor end of rotatable cylinder 21 and carries the thrust loads of the rotating assembly in both directions. The angular contact ball bearing 23 at the turbine end is provided with resilient means in the form of a preload spring 24 that exerts an axial force against the outer race 23a of angular contact ball bearing 23 that is slidably mounted, i.e. a slip fit, in the cylinder bore 25 and does not carry thrust loads of the rotating assembly. The slip fit in the cylinder bore 25 allows axial movement of the ball bearing 23 when the shaft expands axially due to high temperature of operation.

The compressor end of rotatable cylinder 21 has an outwardly projecting annular flange 21b that forms a thrust bearing surface 21c, which is perpendicular to the cylindrical outside surface 21e of rotatable cylinder 21, and cooperates with a thrust bearing surface 11b of the bearing housing 11. The compressor end of rotatable cylinder 21 provides a second thrust bearing surface 21d that cooperates with a thrust bearing surface 12a of end housing 12.

A nominal clearance, such as about 0.005 to 0.010 inch, is provided between the outside diameter 21e of rotatable cylinder 21 and bearing housing bore 11a. Lubricant enters the bearing housing 11 at opening 16, usually from an internal combustion engine lubricating system, and flows to one thrust surface 11b from the nominal clearance between outside diameter 21e of the rotatable cylinder 21 and bearing housing bore 11a. Lubricant also flows into a peripheral V-groove 21f and from the V-groove 21f into a radial hole 21g, and from the radial hole 21g into the central bore of the rotatable cylinder 21 to provide a flow of lubricant to each of the ball bearings 22 and 23. Lubricant flows through the turbine end ball bearing 23 and into the oil drain cavity 17. Lubricant flows through the compressor end ball bearing 22 outwardly between thrust surfaces 21d and 12a and into the drain cavity 17.

Spacer 26 is located between inner races 22b and 23b of bearings 22 and 23, and is clamped in place by the axial force presented by tightening the rotor lock nut 30. The axial force exerted by the rotor lock nut 30 clamps the compressor wheel 15, sleeve 31, the inner race 22b of ball bearing 22, spacer 26, and the inner race 23b of ball bearing 23 tightly against shoulder 13a, thus forming the completed rotor assembly.

The bearing system 20 can be easily inserted into the bearing housing bore 11a due to the nominal clearance between the bore 11a and the outside diameter 21e of rotatable cylinder 21. The bearing system can accommodate axial thrust and expansion of the shaft due to high temperature; provides high mechanical efficiency due to the use of ball bearings, and provides improved bearing life associated with ceramic balls.

Figure 2:
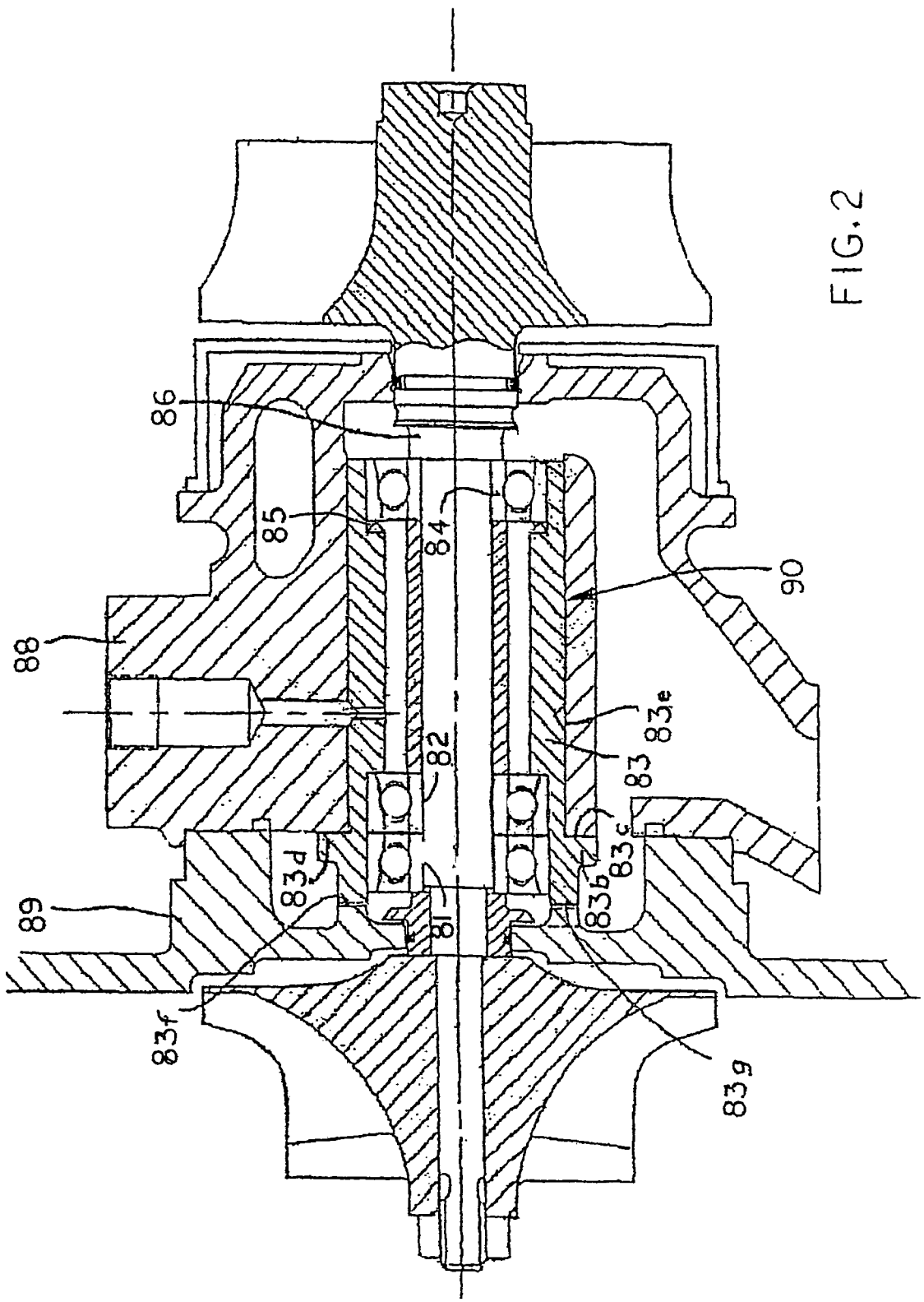
FIG. 2 is a cross-sectional view taken along a plane through the axis of rotation of another bearing system utilizing this invention.

FIG. 2 illustrates another embodiment of this invention, showing a bearing system 90, wherein axial thrust is taken by mounting two angular contact ball bearings 81 and 82 in the compressor end of elongated cylinder 83. An angular contact ball bearing 84 is slidably mounted in the turbine end of elongated cylinder 83. Angular contact ball bearing 81 carries axial thrust in the direction of the turbine end of elongated cylinder 83, and angular contact bearing 82 carries axial thrust in the direction of the compressor end of elongated cylinder 83. Angular contact ball bearing 84 does not carry thrust and is movably mounted with a slip fit in elongated cylinder 83 with a preload spring 85 bearing against its outer race. The preload spring 85 maintains the balls of angular contact ball bearing 84 in contact with its inner and outer races under all conditions, and particularly when heat from exhaust gases causes axial expansion of the shaft 86 to occur.

The compressor end of rotatable cylinder 83 has an outwardly projecting annular flange 83b that forms a thrust bearing surface 83c, which is perpendicular to the cylindrical outside surface 83e of cylinder 83 and cooperates with a thrust bearing surface 83d of the bearing housing 88. The compressor end of cylinder 83 provides a thrust bearing surface 83f that cooperates with a thrust bearing surface 83g of end housing 89.

In all embodiments of this invention, thrust loads are carried on the cooler end of the machines while the rotating shaft is free to expand axially in response to its exposure to heat at the hot end of the machine.

While preferred embodiments of this invention have been shown herein, other embodiments may be devised without departing from the scope of the following claims:

What is claimed is:

1. A turbocharger for an internal combustion engine, comprising
   a stationary housing comprising an exhaust gas volute, a compressor casing and a bearing housing,
   a rotating assembly carried within the stationary housing, said rotating assembly comprising a shaft with a turbine wheel operatively associated with the exhaust gas volute at one end and a compressor wheel operatively associated with the compressor casing at the other end, and
   a bearing system for said shaft comprising an elongated cylindrical bearing carrier rotatably carried by the bearing housing on a film of lubricating oil and including at least two ball bearing means with their inner races axially spaced by a spacer and clamped together within said elongated cylindrical bearing carrier and supporting the shaft in the elongated cylindrical bearing carrier,
   the at least two ballbearing means including a first ball bearing means adjacent the compressor end of the shaft and a second ball bearing means adjacent the turbine end of the shaft,
   said first ball bearing means comprising a bearing assembly including means for carrying axial thrust in both directions,
   said second ball bearing means including a ball bearing that carries no thrust at all with an outer race that is free to move axially within the elongated cylindrical bearing carrier, and resilient means between the elongated cylindrical bearing carrier and said outer race for biasing said outer race axially into engagement with the balls in said ball bearing.

2. A turbocharger as in claim 1, said first bearing means comprising a deep-groove ball bearing.

3. A turbocharger as in claim 1, said second bearing means comprising an angular contact ball bearing.

4. A turbocharger as in claim 1, said first bearing means comprising a first angular contact ball bearing for carrying axial thrust in one direction and a second angular contact ball bearing for carrying axial thrust in the opposite direction.

5. A turbocharger as in claim 1, said first bearing means comprising a deep-groove ball bearing and said second bearing means comprising as angular contact ball bearing.

6. A turbocharger as in claim 1, said resilient means comprising a preload spring.

7. A turbocharger as in claim 1, the balls in said two ball bearing means comprising ceramic balls.

8. A turbocharger for an internal combustion engine comprising,
- a rotating assembly comprising a shaft, and a compressor wheel and a turbine wheel at opposite ends of the shaft,
- a stationary housing comprising an exhaust gas volute for directing exhaust gas through said turbine wheel, a compressor casing for collecting compressed air from said compressor wheel and a bearing system housing,
- a bearing system within said bearing system housing rotatably carrying said rotating assembly, said bearing system comprising an elongated cylindrical bearing carrier removably and rotatably supported by a film of lubricating oil in said housing,
- a first bearing assembly within said elongated cylindrical bearing carrier adjacent the compressor wheel end of the shaft and a second bearing assembly within said elongated cylindrical bearing carrier adjacent the turbine wheel end of the shaft, the inner races of said first and second bearing assemblies being clamped together for rotation and support of said shaft,
- said first bearing assembly comprising ball bearing means including means for carrying axial thrust in both directions,
- said second bearing assembly comprising ball bearing means that carries no axial thrust at all including a bearing with an outer race insertably and slidably carried in an open bore portion of the turbine end of said elongated cylindrical bearing carrier, and resilient means between said elongated cylindrical bearing carrier and said outer race for biasing said outer race against the balls in said bearing.

9. A turbocharger as in claim 8, said elongated cylindrical bearing carrier including outwardly projecting flange surfaces, said stationary housing having surfaces juxtaposed to the outwardly projecting flange surfaces of said elongated cylindrical bearing carrier, said flange surfaces and said juxtaposed housing surfaces cooperating to bear thrust loads of the rotating assembly.

10. A turbocharger for an internal combustion engine, comprising
- an exhaust gas turbine at one end and a charge air compressor at the other end, and a stationary bearing housing therebetween,
- an elongated bearing carrier rotatably carried on a film of lubricant by the stationary bearing housing and carrying a rotatable shaft with exhaust gas-driven turbine wheel adjacent said one end and a charge-air compressor wheel adjacent said other end, said elongated bearing carrier including outwardly projecting surfaces cooperating with adjacent surfaces of said stationary bearing housing to carry bear thrust loads of the rotatable shaft,
- a ball bearing assembly within the compressor end of the elongated bearing carrier with one or more inner races connected with and carrying said rotatable shaft and one or more outer races connected with said elongated bearing carrier, said ball bearing assembly being adapted to carry axial thrust in both directions along the rotatable shaft,
- a turbine end ball bearing within the turbine end of the elongated bearing carrier with its inner race connected with and carrying said rotatable shaft and its outer race being free to move axially within said elongated bearing carrier and unable to carry axial thrust in either direction along the rotatable shaft, and
- an axially-loaded spring between said elongated bearing carrier and said outer race biasing the outer race of the turbine end ball bearing away from the compressor end of the elongated bearing carrier,
- said ball bearing assembly and said turbine end bearing rotatably carrying said rotatable shaft.

11. A turbocharger as in claim 10, said ball bearing assembly comprising a first angular contact ball bearing for carrying axial thrust shaft in the compressor direction along the rotatable shaft and a second angular contact ball bearing for carrying axial thrust in the turbine direction along the rotatable shaft.

12. A turbocharger as in claim 10, said ball bearing assembly comprising a deep-groove ball bearing and said turbine end ball bearing comprising an angular contact ball bearing.

13. A turbocharger as in claim 10, said ball bearing assembly and said turbine end bearing including ceramic balls.

* * * * *